United States Patent [19]

Harford

[11] Patent Number: 4,870,528
[45] Date of Patent: Sep. 26, 1989

[54] POWER LINE SURGE SUPPRESSOR

[76] Inventor: Jack R. Harford, P.O. Box 412, R.D. 2, Flemington, N.J. 08822

[21] Appl. No.: 246,761

[22] Filed: Sep. 20, 1988

Related U.S. Application Data

[63] Continuation-in-part of Ser. No. 241,018, Sep. 2, 1988.

[51] Int. Cl.$^4$ ............................................. H02H 3/20
[52] U.S. Cl. .................................... 361/56; 361/56; 361/111; 361/118
[58] Field of Search .................... 361/56, 58, 57, 91, 361/86, 111, 117, 118

[56] References Cited

U.S. PATENT DOCUMENTS

| | | | |
|---|---|---|---|
| 3,793,535 | 2/1974 | Chowdhuri | 361/56 |
| 4,068,279 | 1/1978 | Byrnes | 361/56 |
| 4,463,406 | 7/1984 | Sirel | 361/91 X |
| 4,563,720 | 1/1986 | Clark | 361/56 |
| 4,584,622 | 4/1986 | Crosby et al. | 361/56 |

Primary Examiner—Derek S. Jennings
Attorney, Agent, or Firm—Kenneth R. Schaefer

[57] ABSTRACT

A surge suppressor comprises a first series circuit having a first inductance and a first alternating voltage limiter, including at least a first capacitance and a bidirectionally conductive rectifying circuit for charging the first capacitance, coupled between first and second input terminals for limiting surge currents and voltage excursions coupled to first and second load output terminals. The first alternating voltage limiter further comprises a sensing circuit for sensing at least one of the charging current supplied to and the voltage developed across the first capacitance. An auxiliary energy storage circuit and a normally open switching device responsive to the sensing circuit are provided for coupling the auxiliary energy storage circuit across the first capacitance during high energy surge conditions.

16 Claims, 2 Drawing Sheets

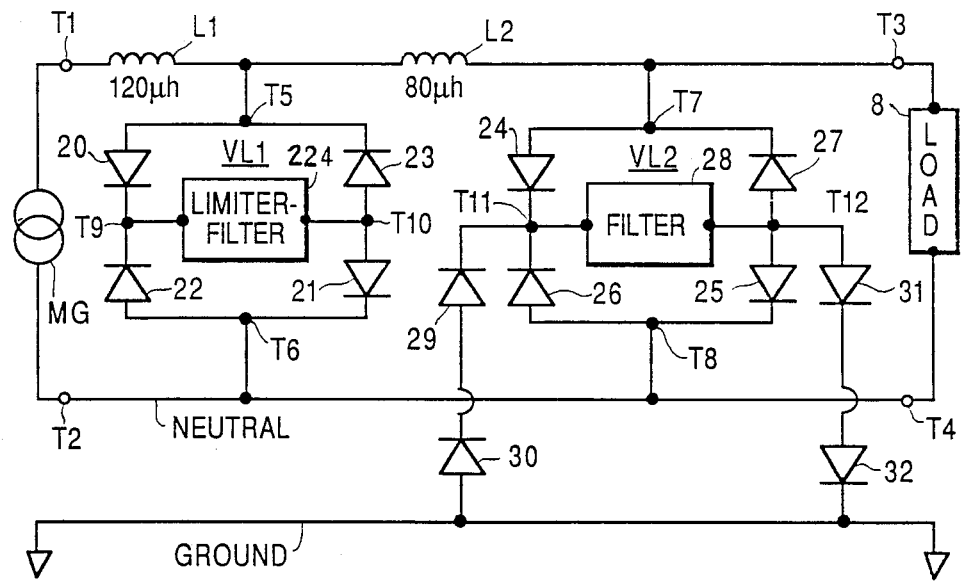
FIG. 1
FIG. 5
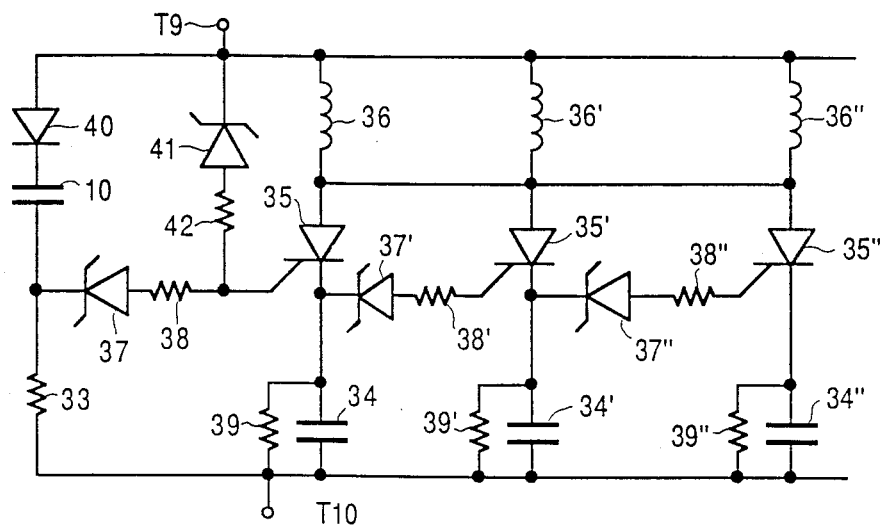

POWER LINE SURGE SUPPRESSOR

This application is a continuation-in-part of my application Ser. No. 241,081, filed Sept. 2, 1988, entitled "Power Line Surge Suppressor".

The present invention relates to power line surge suppressors which provide protection to electronic equipment even during lightning storms.

BACKGROUND OF THE INVENTION

Electronic equipment is susceptible to damage owing to high spike voltages being coupled to the A-C power mains from which they obtain operating energy. Such spike voltages can be caused by surges arising from inductive loads, lightning storms, or the like.

The highest potential transient spike voltages are short in duration, typically tens of microseconds. These high potential spikes can range into many thousands of volts, and many thousands of amperes. Such high voltages tend to overstress electronic components, subjecting them to hazardous and unwanted operating conditions. Owing to the low source impedance of the A-C mains and very high potentials involved, very large currents flow during component breakdown. As a result, dissipation in the components may be substantial, often resulting in their being destroyed.

Heretofore, it was customary to use power mains frequency isolation transformers in D-C power supplies obtaining energy from the A-C power mains, to isolate the power mains voltage from the equipment for safety reasons. The self-inductance and distributed capacitance of the isolation transformer windings integrated the energy contained in transients caused by lightning or other sources received from the A-C power mains. As a result, voltage excursions delivered to the load were minimal and were current limited by the transformer. More recently, to lower cost and reduce size and weight, there has been a tendency to eliminate mains isolation transformers. Instead, the A-C mains voltage frequency is rectified directly to supply direct operating voltage to a switched-mode voltage regulator. This regulator, in turn, provides electrical isolation via a high frequency transformer that supplies subsequent electronic equipment (such as a television receiver or computer equipment). This newer design (switched-mode supply) electronic equipment has proven to be undesirably susceptible to damage from surges or transients on the A-C power mains.

In response to this problem, a number of line surge suppressors have been marketed, though none to the knowledge of the present inventor, other than that disclosed in the parent of this application, has offered satisfactory protection for electronic equipment during lightning storms with reasonable life, cost and reliability. A number of available line surge suppressors contain voltage limiting devices (usually Metal Oxide Varistors—MOVs) for connection in shunt across the A-C power mains, which voltage limiting devices have very large ONE-TIME surge current handling capability—e.g. 4500 or 6500 amperes. Spark gaps, gas discharge tubes and zener diodes also have all been employed, but each such component has either a serious reliability problem or an operational characteristics problem, or both, as they are applied in power line surge suppressors (see, for example, U.S. Pat. Nos. 4,563,720—Clark, 3,793,535—Chowdhuri, 4,068,279—Byrnes, 4,463,406—Sirel, 4,628,394—Crosby et. al.).

A common problem with the shunt protector design concept is that the A-C mains have a very low source impedance, so the shunt voltage regulation afforded by these voltage limiting devices is severely compromised due to the lack of current limiting. Furthermore, the high current rating of 4500 or 6500 amperes of such varistors is a ONE TIME rating, after which the characteristics of the metal oxide varistor are permanently compromised for subsequent transients. What has been found to be needed to make the shunt voltage regulation of the limiting devices effective is a series pass element as described in my above-noted application to augment the impedance of the A-C power mains and the A-C line cord. Unless such a series-pass element is provided, a high energy transient applied directly across the varistor or other voltage limiting device is supplied from a very low source impedance that is capable of continuing to support current flow at unpredictably high currents, perhaps approaching or exceeding the limit of the surge current handling capability of the voltage limiting device, and compromising performance for subsequent transients. The thousand ampere or more surge current is accompanied by a several hundred volt peak voltage developed across the voltage limiting device, and the electronic equipment receiving operating voltage from across the voltage limiting device often succumbs to the overvoltage. This is so even though (as the manufacturers of the line surge suppressors point out) the line surge suppressor itself is capable of withstanding the rated lightning-caused surge at least once before becoming ineffectual. Furthermore, there is generally no indication given when the surge suppressor has experienced such an event and the transient protection of the varistor no longer meets the original specifications.

In order to provide the necessary protection, a series pass element is required between the A-C mains and the voltage limiter which is able to withstand 6,000 volts peak, which carries the line current and exhibits sufficiently low impedance that its insertion loss during normal operation at A-C power mains frequency is reasonably low, but exhibits high impedance and high loss during voltage spikes.

It has been found to be difficult to obtain consistently adequate shunt regulation against high energy surge voltages utilizing only one stage of voltage limiting. Furthermore, voltage limiting devices can survive high energy surges indefinitely only if the current is properly limited. For these reasons, a cascade of shunt voltage limiters has been found to be desirable to protect a load such as a switching regulator from these surges on a repeated basis.

In a cascade of voltage limiters, the first stage is required to withstand the greatest stress (particularly voltage). Filter capacitors in such a first stage necessarily are larger, have a higher voltage rating and therefore are more costly. For example, in the first stage limiter described in my above-identified application, a 6000 volt, 3000 ampere surge occurring on the A-C mains could result in a level of as much as 500 volts being produced across the storage capacitor in that first stage. A single electrolytic capacitor of the required capacitance and having a surge rating of 500 volts is costly and bulky. Furthermore, such a capacitor would exhibit a series resistance which would have to be taken into account in the circuit design, thereby requiring a higher valued capacitor than simple calculations would indicate. In order to reduce the cost and size of such components, it is desirable to provide an auxiliary energy storage means in a first stage voltage limiter, the auxiliary storage means being arranged to be operative only in response to surge energy above a predetermined level for storing momentary excess energy surges and thereafter slowly dissipating the energy so stored.

SUMMARY OF THE INVENTION

The present invention is embodied in a line surge suppressor with the capability for reliably and repeatedly protecting a load such as a switched mode power converter against high energy transient spikes on a low impedance A-C power mains supplying input power to the load, which line surge suppressor is of the following type. A first alternating voltage limiting means is coupled in series connection with a first inductor between first and second input terminals, between which terminals the power mains voltage is supplied. The series connection functions as a first stage shunt regulator of transient voltage spikes. In the preferred embodiments of this invention, the alternating voltage limiting means comprises symmetrical peak detection (mains voltage tracking), clipper (peak limiting) and charge storage circuitry constructed using current rectifier diodes and at least one storage capacitor. In addition, an auxiliary energy storage means such as a capacitor is provided which is normally decoupled from the system and is added in parallel with a first capacitance when surges beyond a predetermined limit occur.

BRIEF DESCRIPTION OF THE DRAWING

FIG. 1 is a schematic diagram of a line surge suppressor embodying invention, in which a first stage shunt regulator employs, a first inductor and peak limiting circuitry and in which a second stage shunt regulator employs a second inductor and second peak limiting circuitry;

FIG. 5 is a schematic circuit diagram of a cascade of triggerable circuits which may be employed instead of the voltage limiter circuit of FIG. 2.

DETAILED DESCRIPTION OF THE DRAWING

Figure 2:
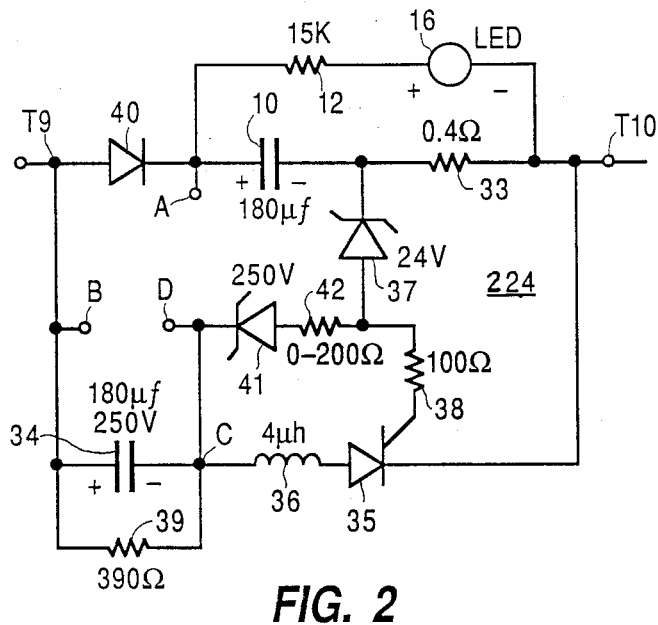
FIG. 2 is a schematic diagram of the preferred circuitry for the first stage peak limiter of FIG. 1.

In FIG. 1, an alternating current (A-C) source MG represents a power mains voltage generator for delivering a nominal 110-115 volts at low impedance to terminals T1 and T2 of a common wall (household) receptacle. A two prong plug of a line cord (not shown) of a line surge suppressor 5 is inserted into (connected to) terminals T1 and T2. The line cord is included in the series connection of a first inductor L1 and a first voltage limiting means VL1, the limiting means VL1 being connected between terminals T5 and T6 to provide a first stage shunt regulator for limiting the amplitude of transient voltage spikes appearing across first voltage limiter VL1. Voltage peaks of either polarity are limited in amplitude by voltage limiter VL1. All of the current supplied from mains MG to the terminals T1, T2 passes through the inductor L1.

The 110 volts supplied at terminals T1 and T2 during normal (non-transient) operation appears across voltage limiter VL1. During normal operation, this voltage would be suitable for being applied to output load terminals T3 and T4 of a line surge suppressor output receptacle (not shown). Output terminals T3 and T4 normally receive a plug connecting via a line cord (not shown) to equipment (a load) 8 which is to be protected against high energy surges. A second surge shunt regulator is connected in cascade after the first surge shunt regulator provided by inductor L1 and voltage limiter VL1 in order that the voltage between output terminals T3 and T4 be properly contained to a level of, for example, 1.5 times the normal peak line voltage (i.e. about 250 volts peak) or less during a line surge.

A second inductor L2 and a second means (VL2) for limiting the amplitudes of voltage peaks of either polarity similarly are in series connection across voltage limiter VL1 to provide the second surge shunt voltage regulator. The cores of inductors L1 and L2 preferably are oriented to minimize mutual inductance between them if they are packaged in proximity to each other, so that there is no substantial voltage transformer action between inductors L1 and L2 (e.g. the cores are physically oriented at 90° to each other).

The means VL1 and VL2 for limiting the amplitude of voltage peaks appearing between terminals T3 and T4 are shown as being connected in the circuit via terminals T5, T6, and T7, T8 respectively. Reference will be made to these four last-named terminals when describing how alternative means as shown in FIGS. 2, 3, 4 and 5 of the drawing are connected when such alternatives are used in the practice of the invention.

Second voltage limiter VL2 is a fast acting means for limiting voltage transient spikes, conducting in 50 nanoseconds or less after a transient exceeds the peak line voltage. Voltage limiter VL2 is a symmetrical peak limiting circuit which provides transient peak clipping action that disregards slower variations in the peak to peak amplitude of the A-C power mains voltage.

Figure 3:
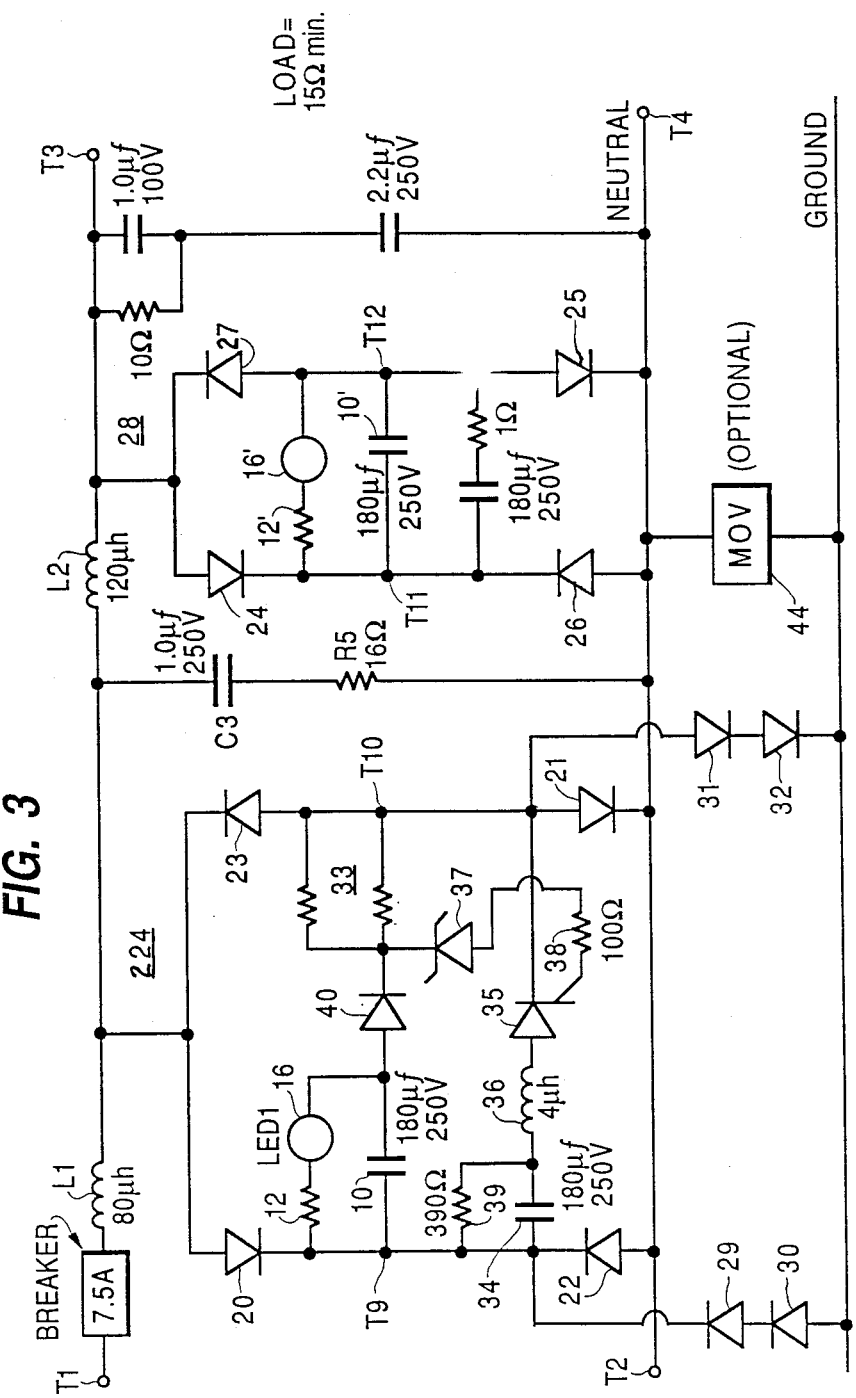
FIG. 3 is a schematic diagram of an alternative arrangement for the line surge suppressor of FIG. 1.

As is shown in FIG. 1, the first stage voltage limiter VL1 comprises four current rectifier diodes 20, 21, 22, 23 coupled in a full wave, full bridge configuration between terminals T5 and T6, the latter terminal (T6) being connected to the "neutral" line (Terminal T2) of the A-C mains generator MG. A limiter filter 224 details of one embodiment of which are shown in FIG. 2, is connected across the diagonal of the rectifier bridge configuration between terminals T9 and T10. The second stage voltage limiter VL2 also comprises four current rectifier diodes 24, 25, 26, and 27 coupled in a full wave, full bridge configuration between terminals T7 and T8, the former (T7) being connected to one terminal (T3) associated with load 8 and the latter (T8) being connected to the other load output terminal T4 and neutral terminal T2 of the A-C mains generator MG. A filter circuit 28, one embodiment of which is shown FIG. 3, is connected across the diagonal of the bridge rectifier circuit between terminals T11 and T12. A common mode protection circuit comprising first and second series connected diodes 29, 30 and third and fourth series connected diodes 31, 32 is coupled either between terminals T11, T12 and ground as shown in FIG. 1 or between T9, T10 and ground as shown in FIG. 3.

As is shown in FIGS. 2 and 3, the limiter-filter 224 includes a first capacitor 10 coupled between terminals T9 and T10 while the filter 28 (FIG. 3) includes a first capacitor 10' coupled between terminals T11 and T12. The full wave bridge configuration of diodes 20-23 on the one hand and the full wave bridge configuration of diodes 24–27 on the other hand develop across capacitors 10 and 10,, respectively, a voltage substantially equal to the normal peak value of the A-C power mains voltage (e.g. 155–160 volts). Since the A-C power mains voltage is relatively constant and repetitive, the voltage across capacitors 10 and 10' is relatively constant. Current discharge or bleeder resistors 12 and 12', respectively, discharge a small amount of the charge placed on capacitors 10 and 10' by the A-C power mains peak voltage so that the voltage across capacitors 10 and 10' represents the most recent value of the A-C power mains peak voltage, in spite of minor fluctuations in the mains voltage. When the A-C power mains voltage is at peak voltage and of a polarity for easy conduction of, for example, diodes 20 and 21 or diodes 23 and 22, as the case may be, capacitor 10 will receive charge on a repetitive basis until the voltage across capacitor 10 assumes the peak value of the A-C mains voltage. At that time, the rectifier diodes 20–23 cease conduction, except to replenish the charge depleted by the bleeder resistor 12. When a transient spike whose voltage is greater than the mains voltage occurs, depending on the polarity of the transient, either diodes 20 and 21 conduct or diodes 23 and 22 conduct, presenting a very low impedance to the transient. Capacitor 10 initially will absorb the transient current, and depending on the magnitude and duration of the transient, will be charged to a new voltage higher than the peak of the A-C mains voltage.

In the case of relatively high energy surges (that is, where the charging current applied to capacitor 10 exceeds a threshold such as sixty amperes), in accordance with the present invention, an auxiliary energy storage circuit is coupled across capacitor 10.

To that end, as is shown in FIG. 2, a relatively small valued current sensing resistor 33 (e.g. 0.4 ohms) is connected in series with capacitor 10. A second energy storage capacitor 34 is coupled across capacitor 10 by a switching means comprising the main (anode-cathode) conduction path of a normally non-conducting silicon controlled rectifier (SCR) 35. A relatively small valued choke or inductor 36 is also coupled in the series circuit including capacitor 34 and SCR 35. A discharge resistor 39 is connected across capacitor 34. A voltage threshold device 37 such as a 24 volt zener diode is connected in series with a current limiting resistor 38 from the gate electrode of SCR 35 to a junction between capacitor 10 and current sensing resistor 33. Resistors 33 and 38 along with threshold device 37 provide a triggering circuit for initiating conduction in the main anode-cathode path of SCR 35 when the charging current associated with capacitor 10 exceeds, for example, sixty amperes. Specifically, the value of current sensing resistor 33 and the threshold of zener diode 37 are selected according to the desired current level at which capacitor 34 is to be coupled in parallel with capacitor 10. Thus, when the charging current of 60 amps flows in resistor 33, a voltage of twenty-four volts is generated across resistor 33. Any further increase in current will cause zener diode 37 to conduct and thereby cause SCR 35 to conduct. Capacitor 34 is normally totally discharged (by virtue of the parallel connection of resistor 39) and therefore presents a substantially short circuit across the terminals T9 and T10 when SCR 35 conducts. Capacitor 34 is thus able to absorb a relatively large inrush of current. Relatively small inductor 36 is provided to slow the inrush of current to an acceptable value for the SCR 35. A reverse current blocking diode 40 is coupled in series between the first capacitor 10 and the auxiliary capacitor 34 and is poled so that, when SCR 35 is conducting, charge previously stored on capacitor 10 is prevented from discharging to capacitor 34. SCR 35 will return to a non-conducting state when the surge current diminishes as a result of a flyback effect of the energy stored in inductor L1. That flyback effect will tend to momentarily allow the voltage across limiter VL1 to fall below the voltage across capacitor 34, thereby allowing the current in SCR 35 to drop to zero and turn SCR 35 off. In any event, the SCR 35 will cease conduction whenever the instantaneous voltage across limiter VL1 falls below the voltage across capacitor 34 due to cessation of a surge or a normal A-C voltage swing. Thereafter, the voltage across capacitor 34 decreases as a discharging current flows in resistor 39. The auxiliary energy storage circuit operates in response to any similar sudden surges so as to absorb energy and thereby prevent unwanted sudden increases in let-through voltage to the second stage voltage limiter VL2.

While the foregoing arrangement, in which charging current of capacitor 10 is sensed, provides suitable protection for many surge conditions, it has been found to be advantageous to couple the additional energy storage capacitance 34 across capacitor 10 under certain conditions where excessive surge voltages (as compared to currents) occur. To that end, a voltage sensing device such as a 250 volt zener diode 41 is coupled across capacitor 10 and also to the gate circuit of SCR 35 (i.e. at the junction of zener diode 37 and resistor 38). A current limiting resistor 42 is connected in series between zener diode 41 and gate resistor 38. The cathode of voltage sensing zener diode 41 is illustrated as connected to the end of capacitor 34 (terminal "C") remote from terminal T9. Thus, the voltage sensed by zener diode 41 is the difference between the voltage across capacitor 34 and the sum of the voltages across blocking diode 40, sense resistor 33 and capacitor 10.

When the charge on capacitor 10 is sufficiently great that its voltage exceeds about 250 volts (in the illustrated case), the zener diode 41 will conduct and cause SCR 35 to conduct, thereby coupling auxiliary capacitor 34 across capacitor 10 to assist in absorbing the high surge energy. As noted above, when the voltage across limiter VL1 falls below the voltage across capacitor 34, SCR 35 will become reverse-biased and will cease conduction. The voltage across capacitor 34 decreases as discharging current flows in resistor 39.

Following the occurrence of energy surges, the excess charge on capacitor 10 will thereafter be discharged by the bleeder resistor 12 until the voltage across capacitor 10 is again equal to the peak value of the A-C mains voltage. A light emitting diode (LED) 16 is coupled in series with bleeder resistor 12 to provide a visible indication that the surge protector is operating.

It should be noted that alternative connections of the voltage sensing circuit described above may be made within the scope of the present invention. For example, the circuit connection in FIG. 2 between terminals D and C may be opened and replaced by a wire between either terminals B and D or between terminals A and D. Each of the foregoing arrangements provides acceptable performance requiring only different values of resistor 42 for appropriate current limiting.

Furthermore, as is shown in FIG. 3, the order in which circuit elements are connected may be changed or the voltage sensing circuit associated with SCR 35 may be omitted according to the requirements of a given installation. Additional filtering elements (R-C networks) may also be provided at various points in the system as shown in FIG. 3. Furthermore, in addition to or in place of the common mode rejection circuit comprising diodes 29-32 associated with first voltage limiter VL1, an MOV device 44 of appropriate triggering level may be provided between neutral (terminals T2, T4) and earth ground.

Typical values for capacitors 10, 10' and 34 are 50-200 microfarads, 250 volts. These desirable values are made feasible by virtue of the presence of a sequence of surge protection operations as described above.

It is generally accepted that lightning-induced transients are limited to about 6,000 volts by virtue of arc-over at electrical receptacles. When a 6,000 volt high energy surge occurs, simulated studies of the present invention using practical components have shown that up to 500 volts peak may appear across first limiter VL1 in the absence of the additional circuits including capacitor 34. That peak voltage is too large to be applied directly to terminals T3 and T4, as damage may result to sensitive electronic equipment from this voltage level (that is, electronic equipment is normally designed to sustain 1.5 to 2 times the normal peak line voltage) For most surges, (that is, up to about 2000 volts), the first stage limiter VL1 has been found to limit the let-through voltage and energy to acceptable levels by virtue of its own operation. When severe surges occur that exceed the preset voltage and/or current sensing levels as described above, the additional energy storage circuit including SCR 35 is actuated to prevent surges from passing through to the load circuit 8. This additional energy storage circuit, unlike gas tube "crowbar" circuits which perform in a somewhat similar manner, does not suffer deterioration during a surge and is self-resetting at the end of the surge. The first limiter VL1, including the additional energy storage circuit, serves to limit voltage levels at the input to the second inductor L2 to less than 300 volts, even for worst case surges (as compared to 550 volts for known, commercial MOV surge protectors). The second voltage limiting stage VL2 further reduces surge disturbances so that they fall within the normal range of variation of the A-C power mains in the absence of surges. That is, maximum peak voltage levels at the load terminals of less than 225 volts may be expected utilizing the present invention.

In order to prevent the initial fast rise time of a high energy spike from being coupled to the equipment to be protected, the present invention includes inductors as the respective series pass elements in both stages of shunt regulation. This introduces the possibility of parametric amplification of pulses, however, which is deleterious to providing adequate line surge suppression. By keeping the Q of at least one of the inductors low enough, parametric amplification can be prevented. Computer studies were conducted that indicated that lossy inductors with Q's of 8 or less at the frequencies of the lightning or high energy transients would provide a suitable response.

A problem that had to be overcome when using cascaded shunt regulators with inductors as series pass elements was unwanted transformer coupling of voltage spikes from the inductor in the first shunt regulator to the inductor in the second shunt regulator. This problem is overcome by arranging the inductors so their respective magnetic fields responsive to current flow are substantially orthogonally (90) disposed relative to each other.

The fast acting regulator stages preferably should be of a nature to respond to transient voltage spikes only a few volts above normal line peak voltage so the dissipation levels encountered in the fast acting voltage limiting device when it is voltage limiting are not excessively large. At the same time, voltage limiting on the mains power line peaks should be avoided during high line conditions, again to limit dissipation levels in the fast acting voltage limiting devices. It was found that charge storage techniques provide an excellent means to provide the proper clamp voltage as well as allowing the transient-induced charge to be bled away safely over time. Symmetrical peak detection of the A-C mains voltage, using current rectifier diode and capacitor energy storage configurations, provide a way to track the normal peak variations in the mains voltage to generate a potential stored on the peak detector capacitor(s) against which potential shunt regulation is performed. Furthermore, the same current rectifier diodes used for peak detection are usable, during a high energy transient voltage spike, for clamping the spike to the reference potential(s) stored on the energy storage capacitor(s) of the symmetrical peak detector, provided the diodes are properly rated.

Since the voltage impressed across a varistor as was previously employed in such applications might be 500 volts, and the current 2,000 amperes, the POWER dissipated in the varistor would be 1,000,000 watts! The power dissipation in a power rectifier diode for the same 2,000 ampere condition would be only 2,000 amperes times 2 volts (the voltage across the diode during the 2,000 ampere conduction), or 4,000 watts, which is over 2 orders of magnitude lower, and within the transient rating of practical, inexpensive power rectifier diodes such as IN5407 or 6A8. With the present invention, the power from the transient surge is thus safely dissipated by multiple components: the inductor(s); the power rectifier diodes; the charge storage capacitor(s) and the capacitor bleeder circuitry which leaks the charge stored on the storage capacitor(s) over a period of time. Furthermore all components are operated within their reliable transient limits resulting in no performance degradation due to the transients, even after multiple transients.

One arrangement which has been found to be particularly advantageous employs a "lossy" inductor for inductor L2 in the embodiment of FIG. 1A "lossy" inductor as that term is used in the present disclosure is an inductor with an inductance in the range of 20 to 200 microhenries, with Q not in excess of 8 at high energy transient frequencies (10 kHz-50 kHz) and whose characteristics do not substantially deteriorate during transient energy pulses. Such an inductor may be wound using a soft iron bar as a core, for example. A suitable inductor consists of about 50 turns of #14 magnet wire wound on a form with a diameter of 1.25 inches and a length of 2.5 inches, wound as a single layer solenoid.

Figure 4:
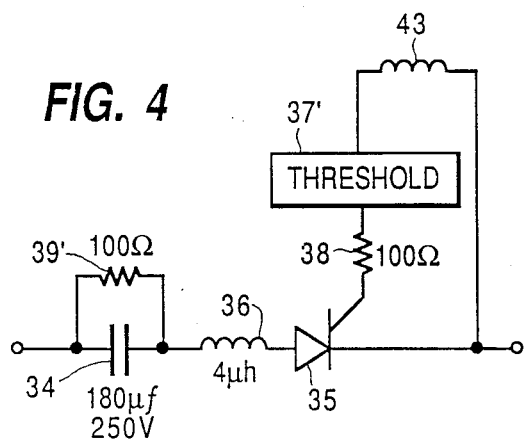
FIG. 4 is a schematic diagram of a modification that may be made to the peak limiting circuitry of the FIG. 1 line surge suppressor.

Referring to FIG. 4, an alternative arrangement is shown for triggering the SCR 35 in the auxiliary energy storage circuit which further comprises capacitor 34 and inductor 36. In FIG. 4, rather than connecting the gate electrode of SCR 35 to a current sensing resistor 33 as in FIG. 2, a secondary winding 43 is provided which is transformer coupled to inductor L1. A threshold device 37' (such as a zener diode of appropriate threshold value) is coupled between secondary winding 43 and the gate electrode of SCR 35 by means of current limiting resistor 38. The SCR 35 is turned on to connect auxiliary capacitor 34 in the circuit when the voltage across inductor L1 (and winding 43) exceeds a selected limit determined by threshold device 37'. This circuit arrangement eliminates the need for the sensing resistor 33 and, furthermore, eliminates the significant voltage appearing across resistor 33 when current flows in that circuit. The overall circuit operation is thereby improved.

Referring now to FIG. 5, a cascade of triggerable limiter-filters are shown which are suitable for connection between terminals T9 and T10 (FIG. 1 or FIG. 2). The first stage of the triggerable limiter-filter is similar to the arrangement shown in FIG. 2 and circuit elements are numbered correspondingly. The arrangement of the parts, particularly auxiliary capacitor 34 and discharge resistor 39, is different from that in FIG. 2. Successive triggerable stages, including an SCR 35' or 35", an additional energy storage capacitor 34' or 34", an additional threshold device 37' or 37", an additional current limiting resistor 38' or 38", an additional discharge resistor 39' or 39" and an additional surge current limiting inductor 36' or 36" are provided. Each of the normally open SCR's 35', 35" is arranged to be triggered into conduction when the voltage across a preceding energy storage capacitor (e.g. capacitor 34 in the case of SCR 35') reaches a predetermined level. In this way, particularly high energy surges may be absorbed by coupling successively more energy storage devices (capacitors 34', 34") into the circuit when required. Otherwise, each of the successive stages operates in a manner similar to that described in connection with FIG. 2.

What is claimed:

1. In a circuit for repeatedly protecting a load against surges occurring on A-C power mains from lighting surges or the like wherein at least first and second input terminals are adapted for connection to an A-C power mains and first and second output terminals are adapted for connection to a load circuit, a surge suppressor comprising:

First series circuit means comprising a first inductance and a first alternating voltage limiting means, including at least a first capacitance and bidirectionally conductive rectifying means for charging said first capacitance, coupled between said first and second input terminals for limiting surge currents and voltage excursions coupled to said first and second output terminals, said first alternating voltage limiting means further comprising sensing means for sensing at least one of the charging current supplied to and the voltage developed across said first capacitance, an auxiliary energy storage means and a normally open switching means responsive to said sensing means for coupling said auxiliary energy storage means across said first capacitance during high energy surge conditions.

2. A surge suppressor according to claim 1 wherein said first alternating voltage limiting means is arranged for charging said first capacitance to a voltage level substantially equal to a normal peak voltage supplied on said A-C power mains during normal power transmission conditions and for charging said first capacitance to a voltage greater than said normal peak voltage during power surge conditions.

3. A surge suppressor according to claim 1 wherein said auxiliary energy storage means comprises an auxiliary capacitance for absorbing high energy transients produced on said A-C power mains.

4. A surge suppressor according to claim 3 wherein said auxiliary energy storage means further comprises a discharging impedance coupled across said auxiliary capacitance for reducing the voltage across said auxiliary capacitance during intervals between power surges.

5. A surge suppressor according to claim 4 wherein said discharging impedance comprises a resistor.

6. A surge suppressor according to any of the preceding claims wherein said sensing means is responsive to the voltage across said first capacitance for closing said switching means so as to store surge energy in said auxiliary energy storage means in response to said voltage exceeding a predetermined level.

7. A surge suppressor according to claim 6 wherein said sensing means comprises a zener diode having a predetermined forward conduction voltage.

8. A surge suppressor according to any one of claims 1-5 wherein said sensing means is responsive to the charging current supplied to said first capacitance for closing said switching means so as to store surge energy in said auxiliary energy storage means in response to said charging current exceeding a predetermined level.

9. A surge suppressor according to claim 8 wherein said sensing means comprises a resistor coupled in series with said first capacitance.

10. A surge suppressor according to any one of claims 1-5 wherein said normally open switching means comprises a silicon controlled rectifier having a main conduction path connected in series relation with said auxiliary energy storage means and a control electrode coupled to said sensing means.

11. A surge suppressor according to any one of claims 1-5 and further comprising a discharging resistor and an indicator device coupled across said first capacitance for indicating continued operation of said surge suppressor.

12. A surge suppressor according to any one of claims 1-5 and further comprising first and second unidirectionally conducting means coupled between respective ends of said first capacitance and earth ground for limiting common mode excursions in said surge suppressor.

13. A surge suppressor according to any one of claims 1-5 and further comprising a blocking rectifier connected in series with said first capacitance and poled for permitting charging thereof when said switching means is open and for preventing discharge thereof through said switching means when said switching means is closed.

14. A surge suppressor according to claim 6 and further comprising:

second series circuit means comprising a second inductance and second alternating voltage limiting means, including at least a second capacitance and second bidirectionally conductive rectifying means, coupled across said first alternating voltage limiting means for further limiting surge currents and voltage excursions coupled to said first and second output terminals.

15. A surge suppressor according to claim 8 and further comprising:

second series circuit means comprising a second inductance and second alternating voltage limiting means, including at least a second capacitance and second bidirectionally conductive rectifying means, coupled across said first alternating voltage limiting means for further limiting surge currents and voltage excursions coupled to said first and second output terminals.

16. A surge suppressor according to any one of claims 1-5 wherein said auxiliary energy storage means comprises a plurality of auxiliary capacitors and associated normally open switching means for coupling said auxiliary capacitors in parallel with said first capacitance in a stepped sequence in response to a relatively long duration surge on said A-C mains.

* * * * *